US012404063B2

(12) United States Patent
Singh et al.

(10) Patent No.: US 12,404,063 B2
(45) Date of Patent: Sep. 2, 2025

(54) SACHET/POUCH CUTTING AND SQUEEZING APPARATUS

(71) Applicant: INDIAN INSTITUTE OF TECHNOLOGY GUWAHATI, North Guwahati (IN)

(72) Inventors: Gurdeep Singh, Ludhiana Punjab (IN); Abhishek Singh, Jamshedpur (IN); Sougata Karmakar, Guwahati (IN)

(73) Assignee: INDIAN INSTITUTE OF TECHNOLOGY GUWAHATI, Guwahati (IN)

( * ) Notice: Subject to any disclaimer, the term of this patent is extended or adjusted under 35 U.S.C. 154(b) by 0 days.

(21) Appl. No.: 18/020,030

(22) PCT Filed: Jul. 8, 2022

(86) PCT No.: PCT/IB2022/056316
§ 371 (c)(1),
(2) Date: Feb. 6, 2023

(87) PCT Pub. No.: WO2022/195572
PCT Pub. Date: Sep. 22, 2022

(65) Prior Publication Data

US 2025/0083854 A1 Mar. 13, 2025

(30) Foreign Application Priority Data

May 25, 2022 (IN) ............................. 202231030090

(51) Int. Cl.
*B65B 69/00* (2006.01)
*B26D 1/02* (2006.01)
*B26D 7/26* (2006.01)

(52) U.S. Cl.
CPC ...... *B65B 69/0033* (2013.01); *B65B 69/0008* (2013.01); *B65B 69/005* (2013.01);
(Continued)

(58) Field of Classification Search
CPC .......... B65B 69/033; B65B 69/00–005; B65B 69/0033; B65B 69/0008;
(Continued)

(56) References Cited

U.S. PATENT DOCUMENTS 2,536,421 A * 1/1951 Burhans .............. B65B 69/0033 30/2
2,714,241 A * 8/1955 Simler .................... B65B 69/00 29/17.7
(Continued)

FOREIGN PATENT DOCUMENTS

CN 203958768 U * 11/2014
CN 104309875 A * 1/2015 ......... B65B 69/0033
(Continued)

*Primary Examiner* — Anna K Kinsaul
*Assistant Examiner* — Mobeen Ahmed
(74) *Attorney, Agent, or Firm* — DITTHAVONG, STEINER & MLOTKOWSKI

(57) ABSTRACT

An improved apparatus 100 for cutting and squeezing sachets/pouches is disclosed, having a cutting and sliding assembly 200 configured to allow linear movement of one or more sachets/pouches and cut the one or more sachets/pouches as the one or more sachets/pouches undergo linear movement; and a roller assembly 300 configured to pull the one or more sachets/pouches through the cutting and sliding assembly, and squeeze the one or more sachets/pouches as the one or more sachets are pulled, the squeezing resulting in extracting contents of the one or more sachets/pouches. The cutting and sliding assembly 200 and the roller assembly 300 are accommodated within a container assembly 400 such that the squeezed out contents are collected within a container of the container assembly 400.

17 Claims, 8 Drawing Sheets

(52) U.S. Cl.
CPC ................ *B26D 1/02* (2013.01); *B26D 1/025* (2013.01); *B26D 7/2614* (2013.01); *B26D 7/2628* (2013.01)

(58) Field of Classification Search
CPC .. B26D 2007/0018; B26D 1/02; B26D 1/025; B26D 7/2614; B26D 7/2628
See application file for complete search history.

(56) References Cited

U.S. PATENT DOCUMENTS

| | | | | | |
|---|---|---|---|---|---|
| 2,901,147 | A * | 8/1959 | Bond, Jr. | B65D 35/285 222/102 |
| 3,265,249 | A * | 8/1966 | Jansson | B65B 69/005 222/101 |
| 4,285,625 | A * | 8/1981 | Yamada | B65B 69/0033 414/412 |
| 4,627,551 | A * | 12/1986 | Kopp | B65D 75/5822 222/102 |
| 4,820,527 | A * | 4/1989 | Christensen | A01K 29/00 426/74 |
| 6,142,883 | A * | 11/2000 | Ferrara | A63B 69/3667 473/218 |
| 7,040,508 | B2 * | 5/2006 | Woersdoerfer | B05C 17/00553 222/102 |
| 11,192,674 | B2 * | 12/2021 | Nehus | B65B 57/04 |
| 2010/0320354 | A1 * | 12/2010 | Prost | A47B 23/041 248/448 |
| 2012/0090280 | A1 * | 4/2012 | Anatrini | B65B 69/0033 53/381.1 |
| 2012/0285122 | A1 * | 11/2012 | Concetti | B65B 43/465 53/139.2 |
| 2017/0099803 | A1 * | 4/2017 | Neighbors | A01K 29/005 |
| 2018/0361047 | A1 * | 12/2018 | Gillespie | A61M 1/167 |
| 2019/0106234 | A1 * | 4/2019 | Franke | B65B 69/0041 |
| 2020/0115092 | A1 * | 4/2020 | Nehus | B65B 69/0008 |
| 2021/0094719 | A1 * | 4/2021 | Franke | B65B 69/0008 |
| 2021/0114761 | A1 * | 4/2021 | Pennington | B65B 69/0008 |
| 2021/0292032 | A1 * | 9/2021 | Trebbi | B65B 69/0058 |
| 2023/0304488 | A1 * | 9/2023 | Eisele | F04B 43/1223 |

FOREIGN PATENT DOCUMENTS

| | | | | |
|---|---|---|---|---|
| CN | 108408170 | A * | 8/2018 | B65B 69/0008 |
| CN | 111645975 | A * | 9/2020 | B65B 69/00 |
| GB | 2512503 | A * | 10/2014 | B65B 69/0008 |

* cited by examiner

SACHET/POUCH CUTTING AND SQUEEZING APPARATUS

TECHNICAL FIELD

The present disclosure relates to the field of equipment for packaging industry. In particular, the present disclosure relates to an apparatus for cutting faulty sachets/pouches and squeezing them for retrieving their liquid content.

BACKGROUND

Background description includes information that may be useful in understanding the present invention. It is not an admission that any of the information provided herein is prior art or relevant to the presently claimed invention, or that any publication specifically or implicitly referenced is prior art.

Fast Moving Consumer Goods (FMCGs) industry is required to pack low-priced items, such as food, beverage, and household/personal care products, that are used on a single or limited number of consumption occasions. Such items are also sometimes referred to as consumer-packaged goods or groceries, and are typically packed in sachets or pouches. These sachets/pouches are filled with the product and sealed on fast-paced parallel assembly lines. Besides filling and sealing, other activities of such assembly lines include labelling and stamping of sachets/pouches, segregating the defective finished goods for rework, dispatching the finished goods, etc.

It is not unusual that while manufacturing the sachets/pouches on highly paced assembly, the finished pouches are rejected. Such rejections may be due to various quality reasons, such as, non-printing of proper batch numbers (label graphic details), inadequately filled quantity, shrinkage of pouches/sachets (due to overheating/vibrating machines), improper cutting (as per standards) etc. Reworking of such defective pouches/sachets is a prominent activity on the FMCG shop floor, especially in assembly lines handling processed food items, such as jams, jellies, pickles, and personal care products, such as hair oil, shampoo, liquid detergent, to name a few.

Since in such rejections it is only the outer part of pouches is considered as waste, reworking involves extracting out the filled liquid (oil/shampoo, as the case may be) out for refilling in new pouches/sachets. Considering the large volume of sachets/pouches produced every day in a typical assembly line, the rework is a full-time activity for any FMCG shop floor.

Rework is often carried out manually by cutting the rejected pouches using sharp-edged blades/cutters, and thereafter squeezing the liquid content out of cut pouches into a container. As can be understood, the manual process of cutting the pouches and extracting the liquid has low productivity and also involves safety risks on account of injury to the operator handling the sharp-edged blades/cutters.

A known apparatus for cutting the defective pouches and extracting their content is based on a perforated base plate and a heavy plate with spikes capable of puncturing the pouches placed on the base plate and squeezing them for extracting the liquid therefrom. The defective pouches are required to be manually placed on the base plate and empty pouches lifted off after extracting the liquid. Besides the heavy plate with spikes is required to be lifted off every time for taking up a new batch of defective pouches. A hydraulic/pneumatic/pulley type mechanism is provided for the same.

Another known apparatus for cutting the defective pouches and extracting their content is based on a frame that is configured to hold a blade/cutter and a roller. The frame fitted with the cutting blade is manually moved over pouches placed over a roller glider cum collection bin, which results in cutting and squeezing of the pouches. As in the earlier case, the defective pouches are required to be manually placed on the base plate and empty pouches lifted off after extracting the liquid, thereby affecting productivity.

As can be seen, the known apparatuses for cutting and squeezing the rejected pouches are not efficient or are complicated, and there is a possibility of providing an apparatus for cutting and squeezing the rejected pouches that is simple and improves productivity.

Therefore, there is a requirement of an improved apparatus for cutting and squeezing rejected pouches that overcomes the drawbacks of the apparatuses known in the art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

OBJECTS OF THE INVENTION

A general object of the present disclosure is to overcome drawbacks of the known apparatuses for cutting and squeezing the rejected pouches.

An object of the present disclosure is to provide an apparatus for cutting and squeezing pouches that allows stacks of pouches of different thicknesses to be cut and squeezed.

An object of the present disclosure is to provide an apparatus for cutting and squeezing the rejected pouches that is simple in construction.

Another object of the present disclosure is to provide an apparatus for cutting and squeezing the rejected pouches that improves productivity of reworking on the rejected pouches.

Another object of the present disclosure is to provide an apparatus for cutting and squeezing the rejected pouches that is simple to use.

Yet another object of the present disclosure is to provide an apparatus for cutting and squeezing the rejected pouches that is ergonomically designed to case the process of reworking on the rejected pouches.

SUMMARY

Aspects of the present disclosure relate to an improved apparatus for cutting and squeezing rejected pouches/sachets (also referred simply as pouches or sachets and all the terms used interchangeably hereinafter) with an aim to recover their content for recycling. Specifically, the proposed apparatus for cutting and squeezing the rejected pouches is configured to enable cutting and squeezing actions while one or more rejected pouches with contents, in form of a single strip or a stack of strips, are fed from one end of the apparatus and the processed pouches with their contents squeezed out comes out from other end of the apparatus, thereby saving effort and time in arranging the rejected pouches on a base plate and thereafter removing the emptied pouches from the base plate, as has been the case with the known apparatuses. Thus, the disclosed apparatus improves efficiency and productivity of processing/reworking of the rejected pouches, with corresponding cost benefits.

In an aspect, the proposed apparatus for cutting and squeezing defective/rejected sachets/pouches for salvaging their contents includes a cutting and sliding assembly and a roller assembly. The cutting and sliding assembly is configured to allow linear movement of one or more sachets/pouches and cut the one or more sachets/pouches as the one or more sachets/pouches undergo linear movement. The roller assembly is configured to pull the one or more sachets/pouches through the cutting and sliding assembly, and squeeze the one or more sachets/pouches as the one or more sachets are pulled. The cutting and subsequent squeezing results in extracting contents of the one or more rejected sachets/pouches.

In an embodiment, the apparatus may also include a container assembly having a container to receive the extracted contents of the sachets/pouches. The cutting and sliding assembly and the roller assembly may be mounted within the container such that squeezed out contents of the one or more sachets/pouches are collected directly within the container.

In an embodiment, the cutting and sliding assembly and the roller assembly may be mounted within the container close to an upper end of the container along a diametrical direction of the container. The container may include a pair of recesses located diametrically opposite to each other aligned with the sliding assembly and the roller assembly such that the two recesses respectively function as entry point and exit point for the one or more sachets/pouches.

In an embodiment, the cutting and sliding assembly may include a cutting blade holder (also referred simply as blade holder and the terms used interchangeably hereinafter) configured to adjustably and removably hold a cutting blade. The cutting blade may be an off the shelf cutting blade.

In an embodiment, the cutting and sliding assembly may include an L-shaped base plate and an L-shaped adjusting plate mounted thereon. The L-shaped base plate and the L-shaped adjusting plate together may define a feeder channel for movement and guiding the one or more sachets/pouches during their linear movement.

In an embodiment, the cutting and sliding assembly may include a holding frame, on which the L-shaped base plate and the cutting blade holder may be fitted.

In an embodiment, the L-shaped base plate may include a slot through which a cutting end of the cutting blade, held with the cutting blade holder, may project within the feeder channel. The projected cutting end can enable cutting of the one or more sachets/pouches as the one or more cutting sachets/pouches linearly move through the feeder channel.

In an embodiment, the cutting blade holder may be configured to hold the cutting blade in adjustable manner to enable adjustment of projection of the cutting end of the cutting blade within the feeder channel.

In an embodiment, the L-shaped adjusting plate may include a dimple which can accommodate a sharp tip of the cutting end of the cutting blade to prevent accidental injury to a user.

In an embodiment, the L-shaped adjusting plate may be adjustably mounted on the L-shaped base plate so that a width of the feeder channel may be adjusted to accommodate different thicknesses of the one or more sachets/pouches.

In an embodiment, the adjustment mechanism for adjusting the width of the feeder channel may include two or more slots provided on the L-shaped adjusting plate and two or more studs mounted on the L-shaped base plate. The L-shaped adjusting plate may be adjustably mounted on the L-shaped base plate through an engagement of the two or more slots of the L-shaped adjusting plate with the two or more studs of the L-shaped base plate and a combination of two or more of wing nuts and a star-type plastic head-handle nut.

In an embodiment, the roller assembly may include a pair of rollers arranged parallel to each other such that the one or more pouches are gripped between the pair of rollers. Rotation of the rollers can result in squeezing and pulling of the one or more pouches.

In an embodiment, the the pair of rollers may include a straight roller and a stepped roller. A step in the stepped roller allows the one or more sachets/pouches with higher thickness to be pulled and squeezed by the roller assembly.

In an embodiment, the roller assembly can include an adjustment mechanism that increases and reduces distance between the rollers to accommodate one or more sachets/pouches of different thicknesses.

In an embodiment, the adjustment mechanism may include a pair of slots provided in an upper horizontal plate and a lower horizontal plate of a frame used for mounting the pair of rollers. One of the rollers may be mounted to the frame through the pair of slots and biased towards the other roller by a tension spring.

In an embodiment, the roller assembly may include a pair of gears coupling the two rollers such that rotation of one of the rollers results in rotation of the other roller in opposite direction.

In an embodiment, the roller assembly may include a handle coupled to one of the two rollers for rotating the pair of rollers.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms are used herein. To the extent a term used in a claim is not defined, it should be given the broadest definition persons in the pertinent art have given that term as reflected in printed publications and issued patents at the time of filing.

Embodiments explained herein relate to an improved apparatus for cutting and squeezing rejected sachets to recover their content for recycling. In an aspect, the disclosed apparatus works based on a cutting and sliding assembly that allows linear movement of one or more sachets/pouches and cuts the one or more sachets/pouches as the sachets/pouches undergo linear movement, and a roller assembly that pulls the one or more sachets/pouches through the cutting and sliding assembly, and simultaneously squeezes the one or more sachets/pouches.

In another aspect, the cutting and sliding assembly and the roller assembly are arranged close to an upper end, and within, a container such that rejected pouches with contents, in form of a single strip or a stack of strips, can be fed from a recess on one end of a diametrical side of the container, and the processed pouches with their contents squeezed out comes out from other recess on other end of the diametrical side of the container. The layout improves efficiency and productivity of processing/reworking of the rejected pouches as compared to the known apparatuses for the purpose.

In yet another aspect, the apparatus can be adjusted to meet the requirement of different thicknesses of the strip of the pouches or stack of strips of the pouches, thereby allowing feeding of a plurality of strips of pouches stacked together, thereby further improving the productivity and efficiency.

In still another aspect, the apparatus includes a handle to rotate rollers of the roller assembly, which makes operation of the apparatus ergonomically easy.

Figure 1A:
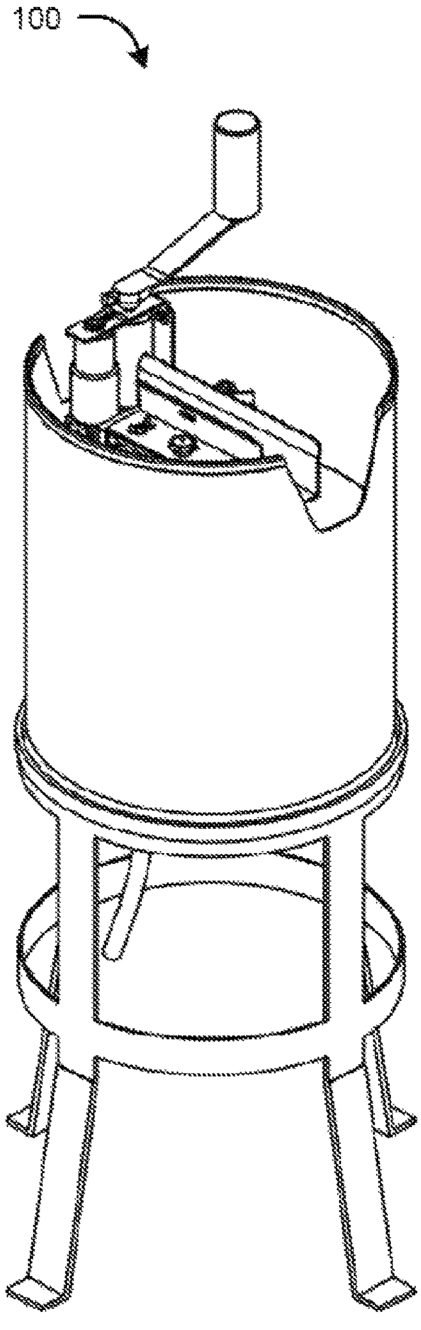
FIGS. 1A and 1B illustrate exemplary perspective and top views respectively of the disclosed apparatus for cutting and squeezing rejected pouches, in accordance with embodiments of the present disclosure.
Figure 1B:
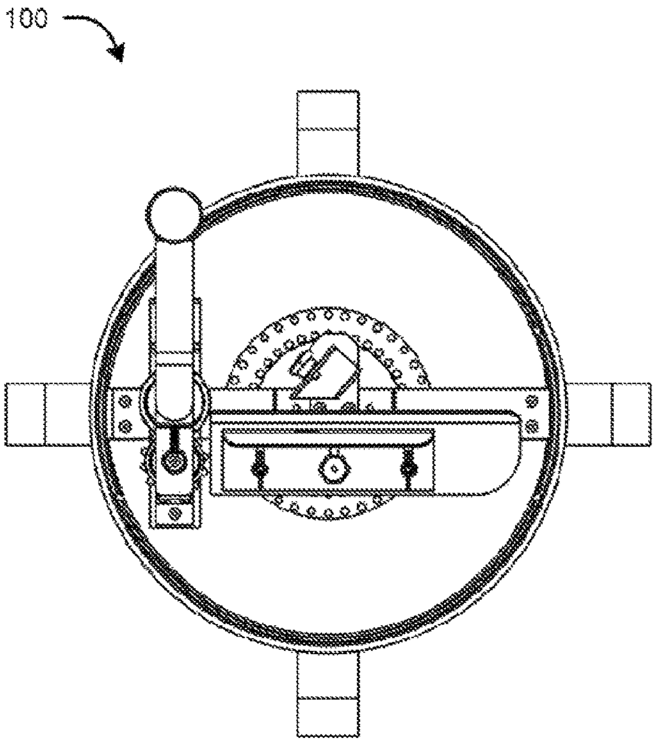
Figure 2:
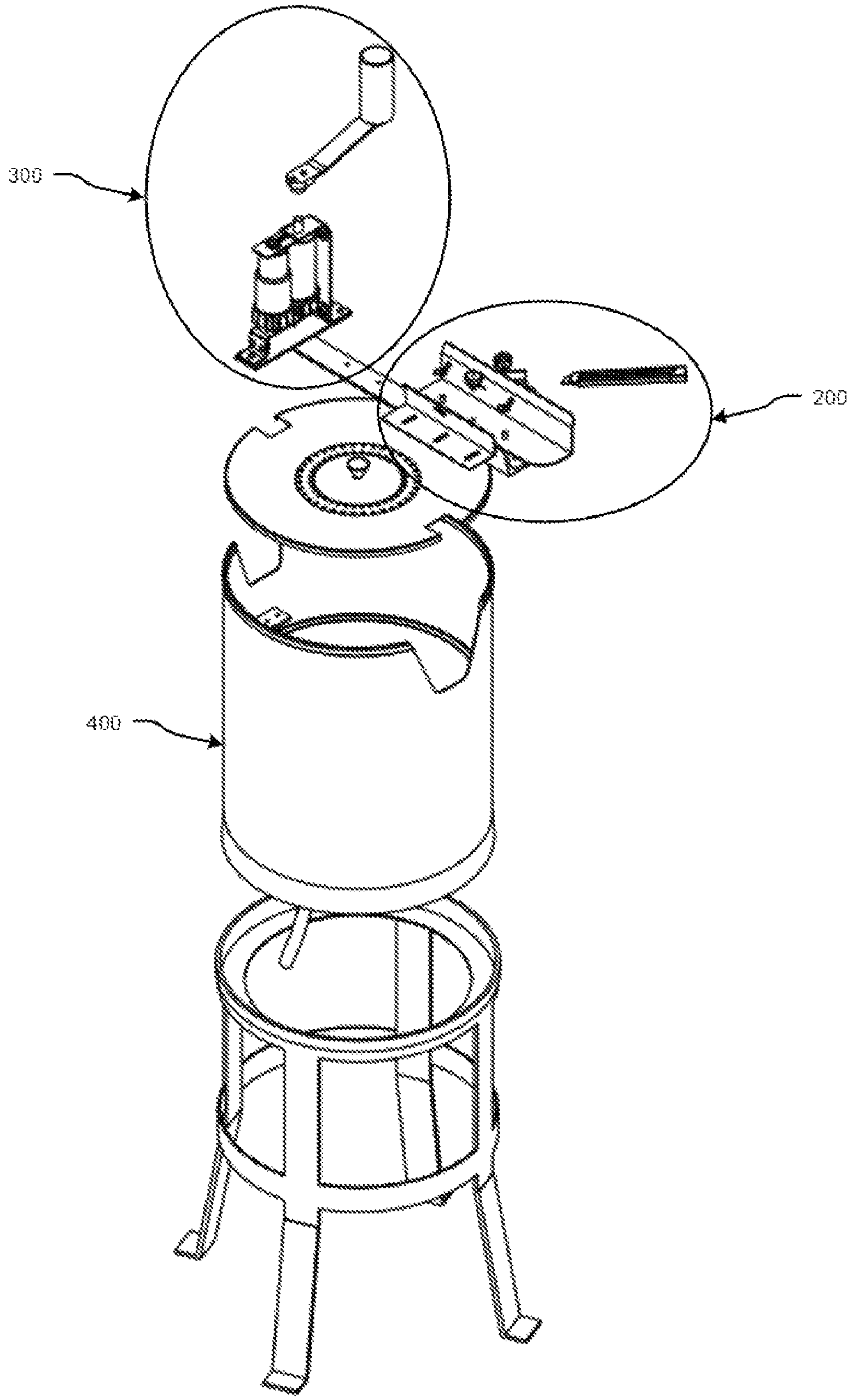
FIG. 2 illustrates an exemplary exploded view of the disclosed apparatus for cutting and squeezing rejected pouches showing the main subassemblies of the apparatus, in accordance with embodiments of the present disclosure.

Referring now to FIGS. 1A, 1B and 2, where different views of the proposed apparatus for cutting and squeezing rejected pouches are disclosed, the disclosed apparatus 100 can include a cutting and sliding assembly 200, a roller assembly 300 and a container assembly 400. The cutting and sliding assembly 200 can be configured to enable linear movement of sachets fed therethrough and simultaneously cut them, using a cutting blade mounted thereon, as they move along a linear direction of the cutting and sliding assembly 200.

The roller assembly 300 can, as shown in FIGS. 1A and 1B, can be configured adjacent the cutting and sliding assembly 200 along a longitudinal direction of the cutting and sliding assembly (i.e., the direction of linear movement of the pouches as they are fed through the apparatus) such that rollers of the roller assembly are able to pull the sachets/pouches through the cutting and sliding assembly. As shown therein, the roller assembly 300 includes a pair of rollers such that the pouches are gripped between the rollers and squeezed as they are pulled.

The container assembly 400 can include a container that can receive the extracted contents of the sachets/pouches. The cutting and sliding assembly 200 and the roller assembly 300 can be be mounted within the container such that squeezed out contents of the one or more sachets/pouches are collected directly within the container. Further, the mounting of the cutting and sliding assembly 200 and the roller assembly 300 within the container is configured to enable feeding of the pouches from a recess, such as recess 402 shown in FIG. 5, on one end of a diametrical side of the container, and the processed pouches with their contents squeezed out comes out from other recess, such as recess 403 shown in FIG. 5, on other end of the diametrical side of the container.

Figure 3A:
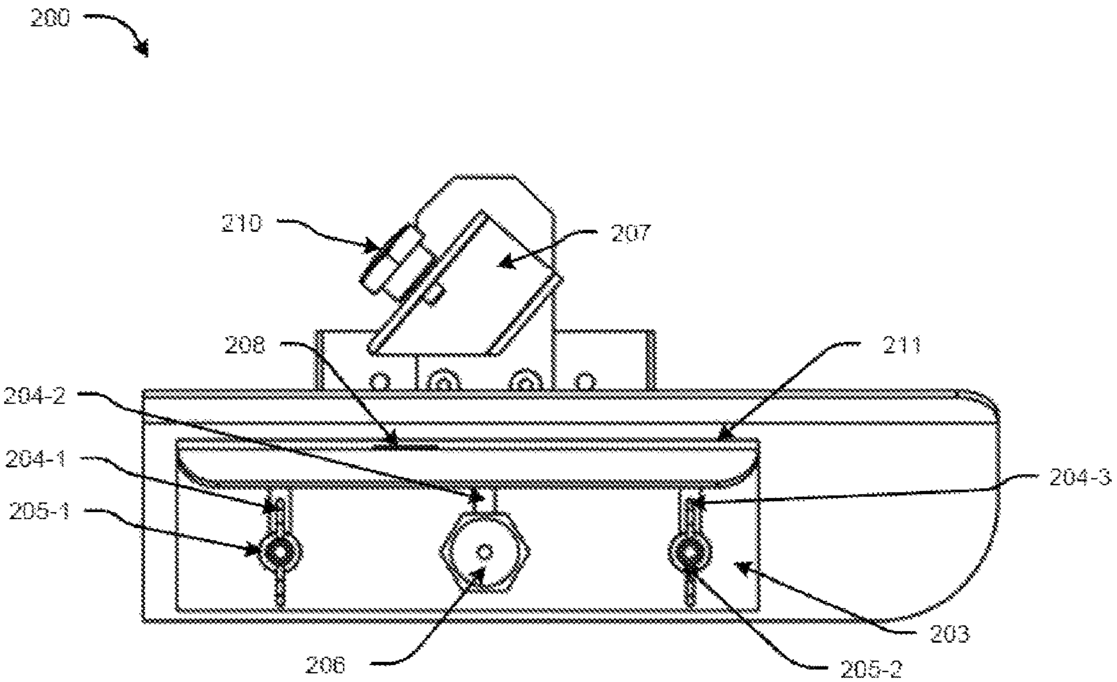
FIGS. 3A to 3C illustrate different views of a cutting and slide assembly of the apparatus, in accordance with embodiments of the present disclosure.
Figure 3B:
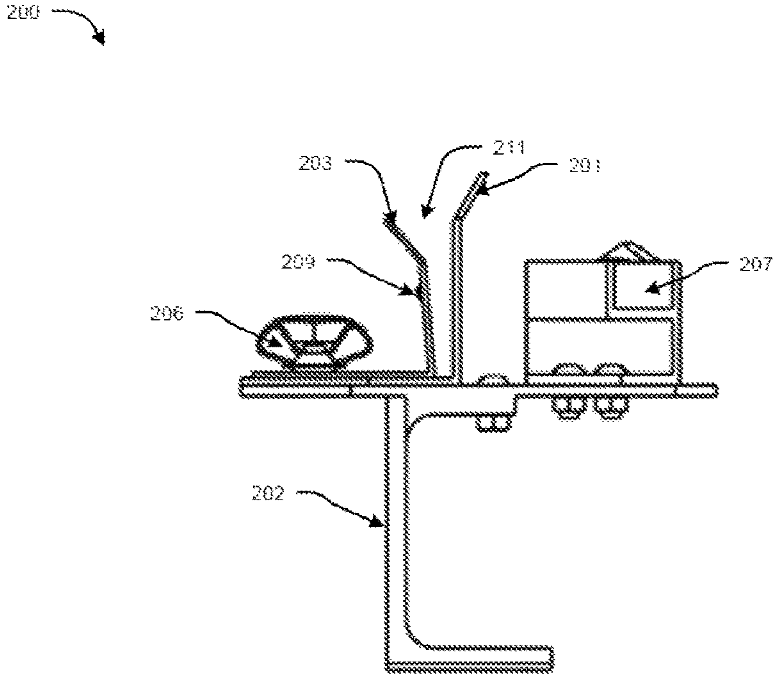
Figure 3C:
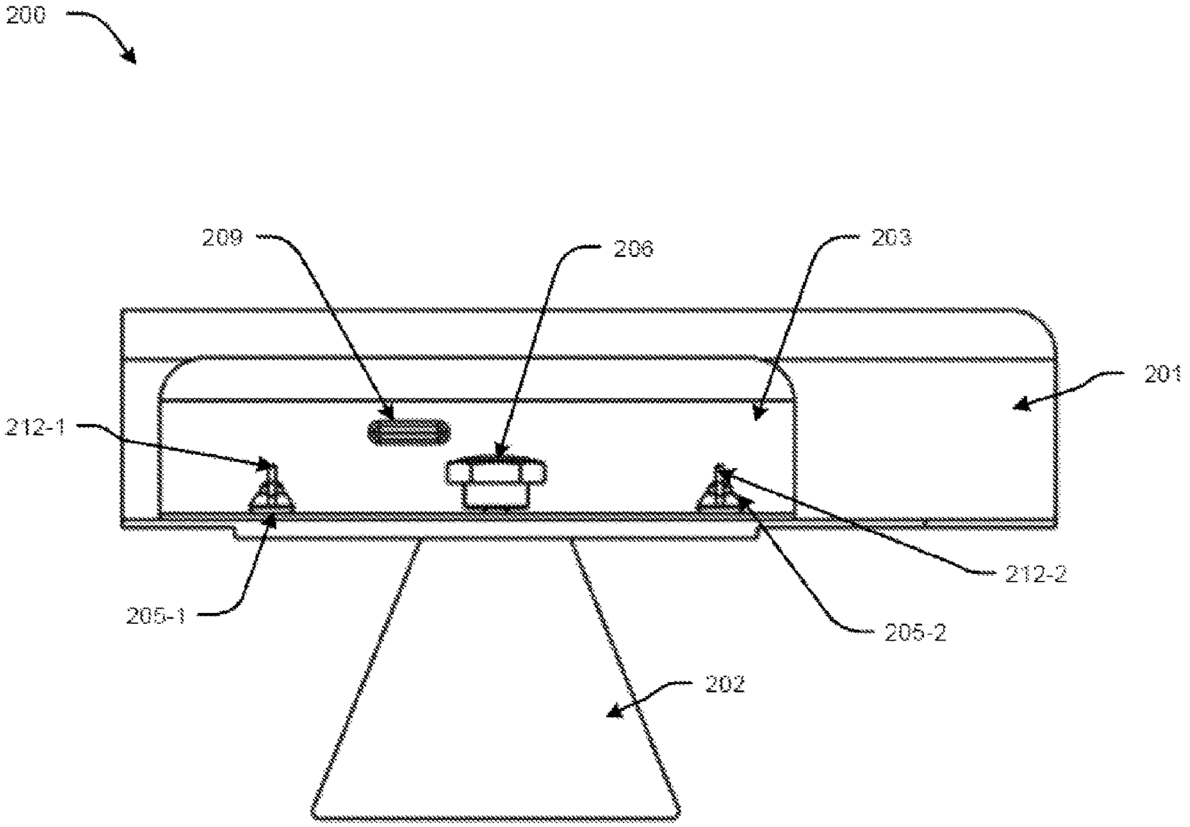

Referring to FIGS. 3A to 3C, the cutting and slide assembly 200 can include a L-shaped base plate 201 mounted upon a holding frame 202. Further, a L-shaped adjusting plate 203 is mounted on the L-shaped base plate 201 such that there is a gap between vertical members thereof. The gap between the vertical members of the L-shaped base plate 201 and the L-shaped adjusting plate 203 form a feeder channel 211 for accommodating the pouches and allowing their linear movement along a longitudinal direction of the L-shaped base plate 201 and the L-shaped adjusting plate 203. As can be understood, the gap defines width of the feeder channel 211 and controls thickness of the pouch or stack of pouches that can be fed through the feeder channel 211.

In an embodiment, L-shaped adjusting plate 203 is movably mounted on the L-shaped base plate 201 such that the gap, i.e., width of the feeder channel 211, can be adjusted by lateral movement of the L-shaped adjusting plate 203. To enable adjustment of the width of the feeder channel 211, an adjustment mechanism is provided that can include two or more slots, such as slots 204-1, 204-2, 204-3 shown in FIG. 3A (hereinafter collectively referred to as slots 204) provided on the L-shaped adjusting plate 203 and two or more studs mounted on the L-shaped base plate 201. The L-shaped adjusting plate 203 can be coupled to the L-shaped base plate 201 by engaging the slots 204 with the corresponding studs, such as studs 212-1, 212-2, shown in FIG. 3C (hereinafter collectively referred to as studs 212), and thereafter fixed by tightening wing nuts 205 and a star-type plastic head-handle nut 206 over the studs 212. In an application there can be three slots 204 with two wing nuts 205 provided on the outer studs 212 and the one star-type plastic head-handle nut 206 provided on the middle stud 212.

In an embodiment, to facilitate cutting of the pouches fed through the cutting and sliding assembly 200, a blade holder 207 can be provided mounted on the holding frame 202, as shown in FIGS. 3A and 3B. The blade holder 207 can be configured to hold any of the cutting blades available off the shelf. The cutting blade can be adjustably and removably held on the blade holder 207 in horizontal orientation. The blade holder 207 can include an adjusting knob 210 to tighten and firmly hold the cutting blade in a desired position, such as at a required length projecting within the feeder channel 211 through a cut slot 208 provided on the L-shaped base plate 201. The projecting cutting blade can enable cutting of the pouches inserted through the feeder channel 211.

In an embodiment, the L-shaped adjusting plate 203 can be provided with a dimple, such as dimple 209 to create a pocket/recess on an inner side of the L-shaped adjusting plate 203. The dimple 209 can be located such that a sharp tip of the cutting end of the cutting blade, when the cutting blade is fitted in the manner as described above, is accommodated within the pocket/recess created by the dimple 209. This can prevent accidental injury to a user from the sharp tip of the cutting blade as the user feeds the pouches through the feeder channel 211.

FIGS. 4A to 4D illustrate different views of a roller assembly 300 of the disclosed apparatus and constituent parts, which includes a pair of rollers 301/302 of same height. The roller can be made of a plastic material, such as but not limited to Acrylonitrile Butadiene Styrene (ABS) plastic. One of the two rollers, such as roller 301, can be a straight roller and the other roller, such as roller 302, can be a stepped roller with an upper part being of lesser diameter as compared to the straight roller 301 and the lower part having the same diameter as the straight roller 301. The smaller diameter of the stepped roller 302 can be configured to facilitate case of initial loading of stack of multiple strips of the pouches/sachets between the rollers, before the rollers 301/302 are rotated for pulling of the pouches. A handle can be coupled to an upper end of the straight roller 301. The handle can include a lever arm 304 and a soft rubber grip 303 fitted at a free end of the lever arm 304. A set of spur gears 305/305*a* can be provided at the lower ends of the rollers 301/302, in mesh with each other, such that rotation of the straight roller 301 by the handle results in rotation of the stepped roller 302 in opposite direction. The spur gears 305/305*a* can be plastic gears made of, but not limited to, ABS plastic.

In an embodiment, the rollers 301/302 and the gears 305/305*a* can be supported on a supporting stainless-steel frame/plates, which can include horizontal plates/members, such as lower horizontal plate 310*a* and upper horizontal plate 310*b*, and vertical plate/member 311. To enable smooth movement of the rollers 301/302, thrust bearings 313, 313*a* can be provided beneath the spur gears 305, 305*a*. The entire roller assembly 300 can further be integrated into the other assemblies of the apparatus 100 using an integrating plate 312.

Figure 4A:
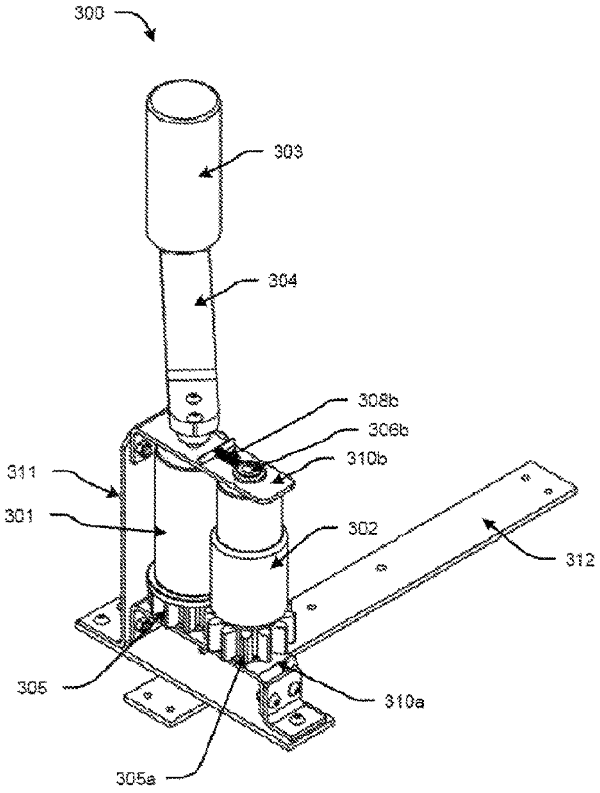
FIGS. 4A to 4C illustrate different views of a roller assembly of the disclosed apparatus, in accordance with embodiments of the present disclosure.
Figure 4B:
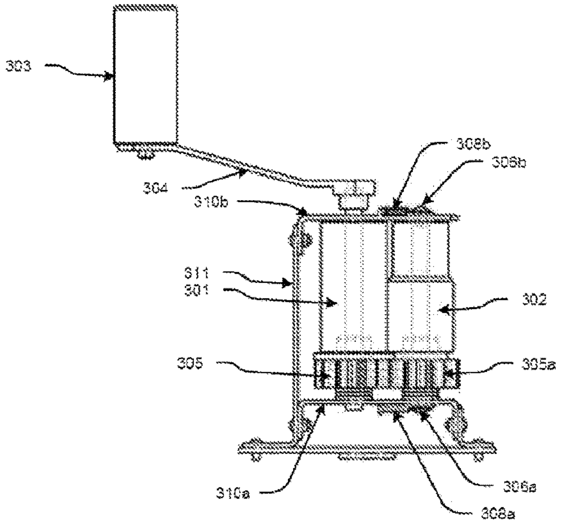
Figure 4C:
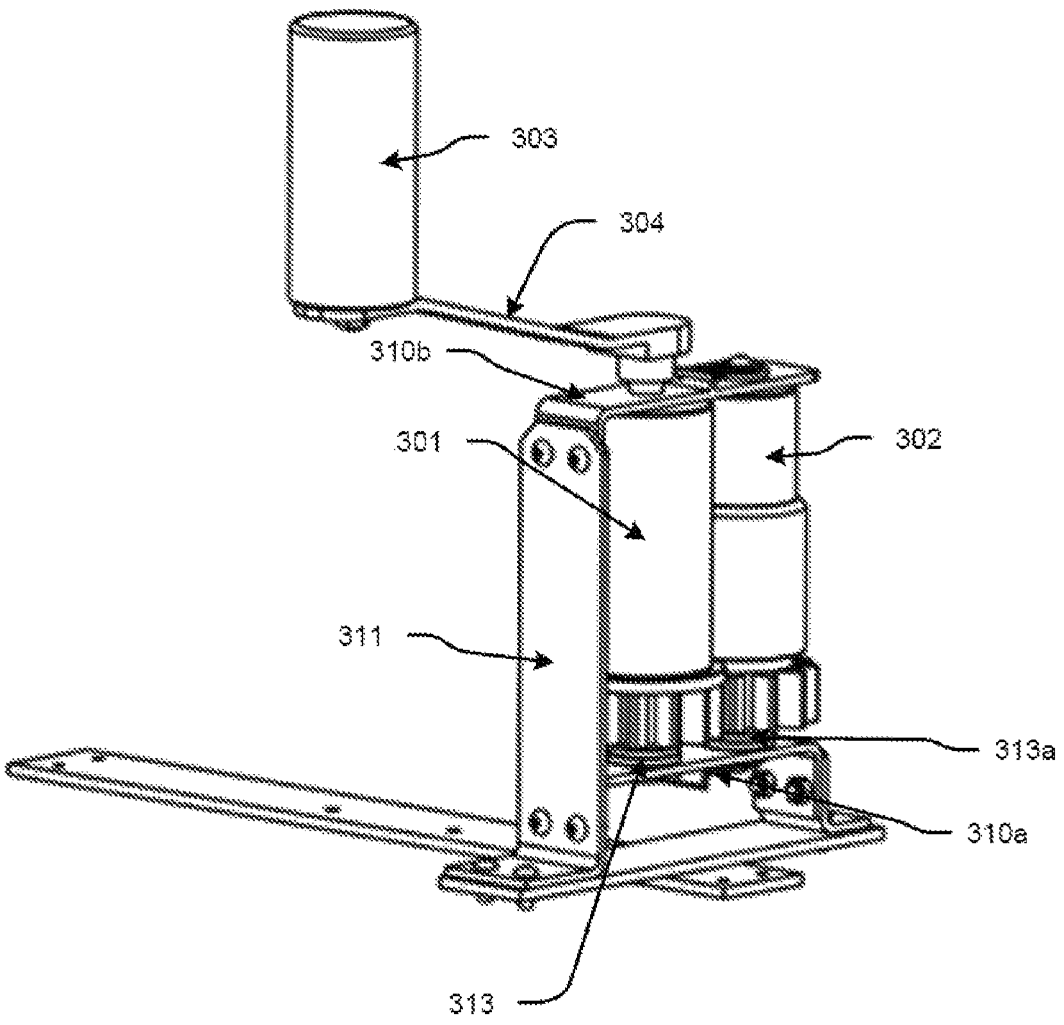
Figure 4D:
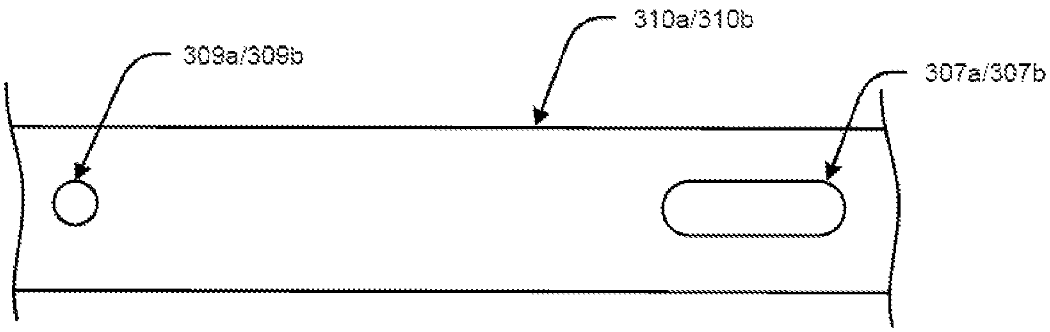
FIG. 4D illustrates an exemplary top view of lower/upper horizontal plates showing roller gap adjusting slots for accommodating sachets of different thicknesses, in accordance with embodiments of the present disclosure.

In an embodiment, lower and upper ends of the stepped roller 302, can be fixed to the frame through dome nuts 306*a* and 306*b* respectively. The frame can include roller gap adjusting slots 307*a*/307*b* (hereinafter, the two slots collectively referred to as slots 307) at the lower and upper horizontal plates 310*a*/310*b*, as shown in FIG. 4D, for holding the stepped roller 302, through which gap between the rollers 301/302 can get adjusted to accommodate different thicknesses of the inserted strips of pouch/sachet or stacks thereof. FIG. 4D also shows holes 309*a*/309*b* (hereinafter, the two holes collectively referred to as holes 309) in the lower and upper horizontal plate 310*a*/310*b* for fixing the straight roller 301. The straight roller 301 fixed to the lower and upper horizontal plates 310*a*/310*b* through the holes 309 remains fixed in a position defined by the holes 309. A set of tension springs 308*a*/308*b* can be provided with the dome nuts 306*a*/306*b* for providing biasing force for movement of the stepped roller 302 towards the straight roller 301 when the thickness of the pouches is less. Thus, the gap between the rollers 301/302 can increase and decrease depending on requirement within the limit provided by the roller gap adjusting slot 307.

Figure 5:
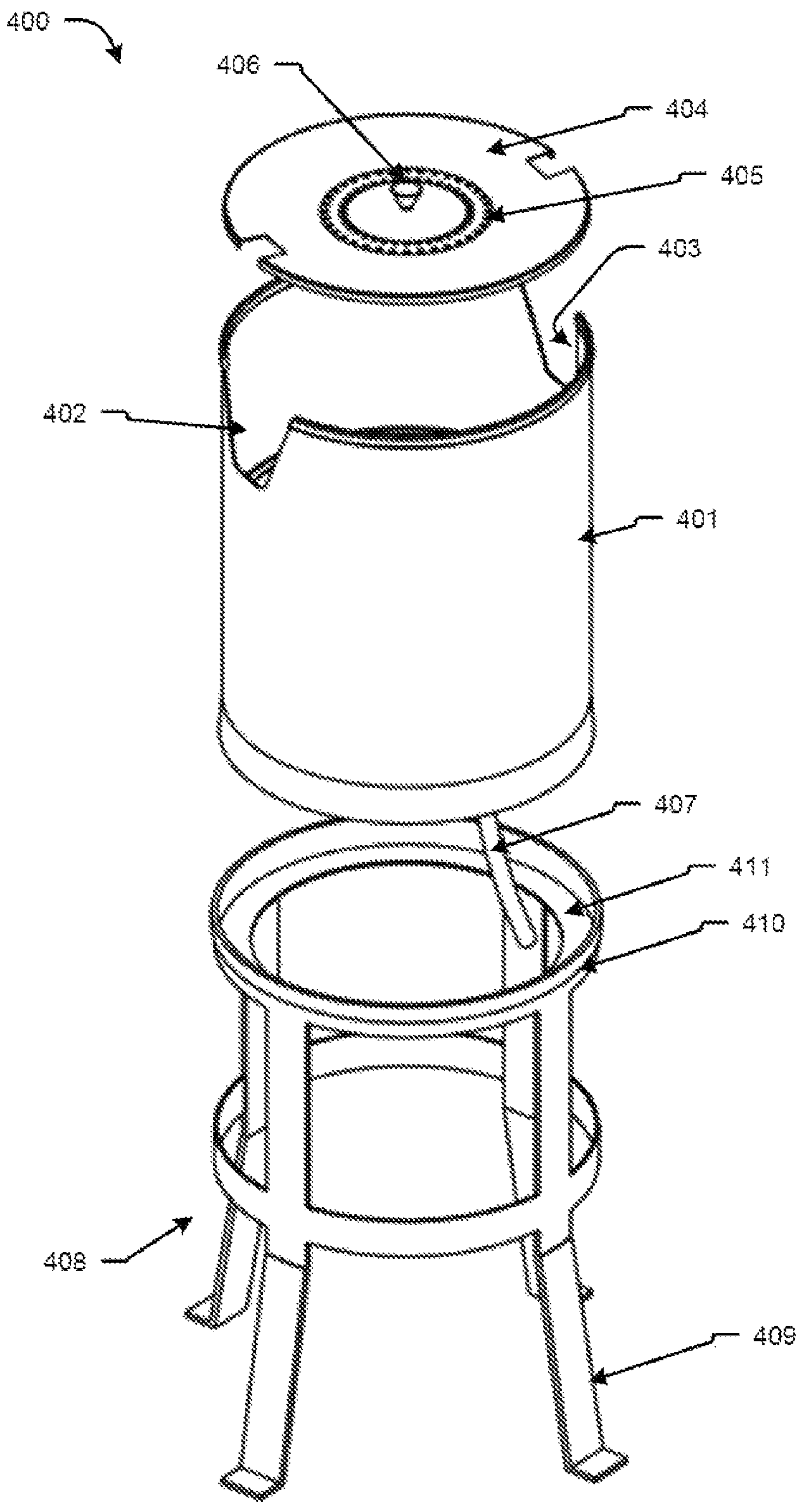
FIG. 5 illustrates an exemplary perspective view of a container assembly, in accordance with embodiments of the present disclosure.

FIG. 5 illustrates a perspective view of the container assembly 400 of the apparatus 100, the container assembly 400 includes a hollow container 401, which can be cylindrical or any other in shape, made of stainless steel, to collect the extracted contents of the pouches/sachets. The container 401 can include a pair of two cut openings 402 and 403 (also referred to as recesses hereinafter) at an upper end of on the circumference of the container 401, which can be located diametrically opposite to each other aligned with the cutting and sliding assembly 200 and the roller assembly 300, when the two are mounted within the container 401. The alignment enables the recesses 402/403 to function as entry point and exit point, respectively, for the sachets/pouches that are fed to the apparatus 100 and provide case of loading of the defective pouch/sachets.

The integrating plate 312 (Refer FIG. 4A) of the roller assembly 300 can be fixed within the container 401 across a diameter of the container 401 between the recesses 402/403 for mounting the cutting and slide assembly 200 and roller assembly 300. A perforated plate 404 with holes 405 can be provided below the integrating plate 312 within the container 401 to collect the extracted contents of the pouches squeezed out from the pouch/sachets. The perforated plate 404 can have a raised outer surface towards its outer circumference and can have a steep slope towards the holes 405 located near center of the plate to maintain downward flow within the container 401. The perforated plate 404 can be held within the container 401 along its circumference by suitable supports provided on inner side of the container 401.

A holder knob 406 can be provided at the center of the perforated plate 404 for easy removal for cleaning and maintenance of the container 401. A drain pipe 407 can be attached at the bottom of the container 401 that can be further connected to a bigger reservoir/collection drum (not shown here) to collect the extracted contents, such as for further re-use. The container 401 can rest over a stand 408 having a plurality of legs 409. Support surface of the stand 408 that supports the container 401 can include rubber grips 411 located within an inner circumference of upper portion 410 of the stand 408 to provide a tight grip and avoid metal to metal contact, thereby protecting against corrosion and friction sound.

Figure 6:
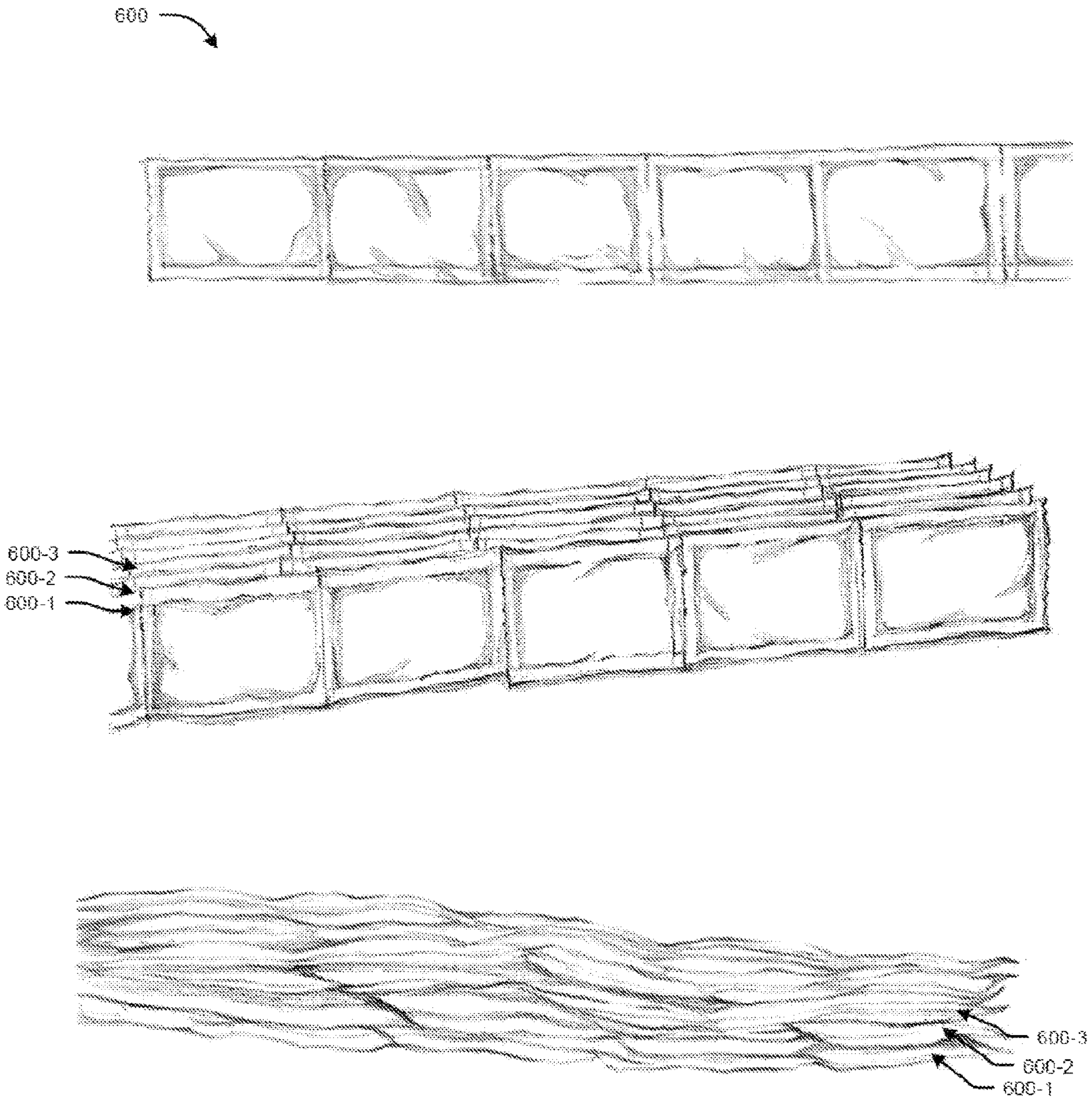
FIG. 6 illustrates exemplary representative sketches of strips of pouches and stacks of pouches that can be processed through the disclosed apparatus, in accordance with embodiments of the present disclosure.

FIG. 6 shows representative sketches of strips 600 of pouches and stacks of strips of pouches, comprising strips 600-1, 600-2, . . . etc., that can be processed through the disclosed apparatus 100. As shown the strips 600 and the stacks of strips 600 of the pouches shall have different thicknesses, and the apparatus 100 includes features that allow to accommodate such variations by adjustment in width of the feeder channel 211 of the cutting and sliding assembly 200, as well as in the roller assembly 300.

In application the strips of pouches, such as strip 600 shown in FIG. 6, either individually or in stacks, such as stack comprising strips 600-1, 600-2, . . . etc., can be manually inserted in the feeder channel 211 through the recess 402 in the container 401 and moved along the longitudinal direction of the cutting and sliding assembly 200 within the feeder channel 211. The movement shall result in cutting of the pouches by the cutting blade held by the cutting and sliding assembly 200. A leading end of the strip/stack of the strips can be engaged between the rollers 301/302 and the rollers rotated by the handle, on which the rollers shall pull the remaining strip through the cutting and sliding assembly 200, and simultaneously squeeze the pouches to extract the contents.

As can be understood, the disclosed apparatus is especially suitable for extracting liquid contents of the pouches, however other contents in semi-solid state can also be extracted with suitable modifications, as would be evident to those skilled in the art.

It is to be further appreciated that while the embodiments of the apparatus 100 have been described with reference to handle facilitating rotation of the rollers, it is possible to provide mechanized means, such as a motor, to rotate the rollers. There can also be a sensor to detect presence of the pouches near the rollers, and the sensor can be coupled to the motor such that motor starts rotating the rollers when presence of the pouches close to the rollers is detected.

Thus, the present disclosure provides an improved apparatus for cutting and squeezing rejected pouches for extracting their contents that overcomes above stated draw backs of known apparatuses for the purpose.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides an improved apparatus that overcomes drawbacks of the known apparatuses for cutting and squeezing the rejected pouches.

The present disclosure provides an apparatus for cutting and squeezing pouches that allows stacks of pouches to be cut and squeezed.

The present disclosure provides an apparatus for cutting and squeezing the rejected pouches that is simple in construction.

The present disclosure provides an apparatus for cutting and squeezing the rejected pouches that improves productivity of reworking on the rejected pouches.

The present disclosure provides an apparatus for cutting and squeezing the rejected pouches that is simple to use.

The present disclosure provides an apparatus for cutting and squeezing the rejected pouches that is ergonomically designed to ease the process of reworking on the rejected pouches.

We claim:

1. An apparatus for cutting and squeezing sachets/pouches, the apparatus comprising:

a cutting and sliding assembly configured to allow linear movement of one or more sachets/pouches and cut the one or more sachets/pouches as the one or more sachets/pouches undergo linear movement; and a roller assembly configured to pull the one or more sachets/pouches through the cutting and sliding assembly, and squeeze the one or more sachets/pouches as the one or more sachets are pulled, the squeezing resulting in extracting contents of the one or more sachets/pouches, wherein the cutting and sliding assembly comprises an L-shaped base plate and an L-shaped adjusting plate mounted thereon, wherein the L-shaped adjusting plate includes a dimple configured to accommodate a sharp tip of a cutting end of a cutting blade within a cutting blade holder within the dimple.

2. The apparatus as claimed in claim 1, wherein the apparatus includes a container assembly comprising a container, and the cutting and sliding assembly and the roller assembly are mounted within the container such that squeezed out contents of the one or more sachets/pouches are collected within the container.

3. The apparatus as claimed in claim 2, wherein the cutting and sliding assembly and the roller assembly are mounted within the container close to an upper end of the container along a diametrical direction of the container.

4. The apparatus as claimed in claim 3, wherein the upper end of the container comprises a pair or recesses located diametrically opposite to each other aligned with the cutting and sliding assembly and the roller assembly such that the two recesses respectively function as entry point and exit point for the one or more sachets/pouches.

5. The apparatus as claimed in claim 1, wherein the cutting blade holder is configured to adjustably and removably hold the cutting blade.

6. The apparatus as claimed in claim 1, wherein, the L-shaped base plate and the L-shaped adjusting plate together defining a feeder channel for the one or more sachets/pouches during the linear movement of the one or more sachets/pouches.

7. The apparatus as claimed in claim 6, wherein the L-shaped base plate includes a slot configured for the cutting end of the cutting blade, held with the cutting blade holder, to project within the feeder channel to enable cutting of the one or more sachets/pouches during the linear movement of the one or more cutting sachets/pouches through the feeder channel.

8. The apparatus as claimed in claim 7, wherein the cutting blade holder is configured to hold the cutting blade in adjustable manner to enable adjustment of projection of the cutting end of the cutting blade within the feeder channel.

9. The apparatus as claimed in claim 1, wherein the cutting and sliding assembly includes a holding frame, and the L-shaped base plate and the cutting blade holder are fitted on the holding frame.

10. The apparatus as claimed in claim 6, wherein the L-shaped adjusting plate is adjustably mounted on the L-shaped base plate to enable adjustment of a width of the feeder channel to accommodate different thicknesses of the one or more sachets/pouches.

11. The apparatus as claimed in claim 10, wherein the L-shaped adjusting plate includes two or more slots and the L-shaped base plate includes two or more studs mounted thereon such that the L-shaped adjusting plate is adjustably mounted on the L-shaped base plate through an engagement of the two or more slots of the L-shaped adjusting plate with the two or more studs of the L-shaped base plate and a combination of two or more of wing nuts and a star-type plastic head-handle nut.

12. The apparatus as claimed in claim 1, wherein the roller assembly comprises a pair of rollers arranged parallel to each other such that the one or more pouches are gripped between the pair of rollers, and wherein rotation of the rollers results in squeezing and pulling of the one or more pouches.

13. The apparatus as claimed in claim 12, wherein the pair of rollers includes a straight roller and a stepped roller, and wherein a step in the stepped roller allows the one or more sachets/pouches with higher thickness to be pulled and squeezed by the roller assembly.

14. The apparatus as claimed in claim 12, wherein the roller assembly comprises an adjustment mechanism that increases and reduces distance between the rollers to accommodate one or more sachets/pouches of different thicknesses.

15. The apparatus as claimed in claim 14, wherein the adjustment mechanism includes a pair of slots provided in an upper horizontal plate and a lower horizontal plate of a frame used for mounting the pair of rollers, and wherein one of the rollers is mounted to the frame through the pair of slots and biased towards the other roller by a tension spring.

16. The apparatus as claimed in claim 12, wherein the roller assembly comprises a pair of gears coupling the two rollers such that rotation of one of the rollers results in rotation of the other roller in opposite direction.

17. The apparatus as claimed in claim 16, wherein the roller assembly comprises a handle coupled to one of the two rollers for rotating the pair of rollers.

* * * * *